Patented June 13, 1939

2,161,940

UNITED STATES PATENT OFFICE 2,161,940

MANUFACTURE OF AMINOTRIAZINES

Gustave Widmer, Basel, Willi Fisch, Riehen, and Josef Jakl, Basel, Switzerland, assignors to the firm of Society of Chemical Industry in Basle, Basel, Switzerland No Drawing. Application May 27, 1938, Serial No. 210,526. In Switzerland June 5, 1937

2 Claims. (Cl. 260—248)

This invention is an improvement in or modification of that forming the subject of the copending specification Ser. No. 113,936.

That specification describes inter alia a manufacture of melamine (2.4.6-triamino-1.3.5-triazine), wherein a cyan derivative of ammonia selected from the group consisting of dicyandiamide or cyanamide is heated in a closed vessel in the presence of ammonia at a temperature above 100° C. under anhydrous conditions or in the presence of a proportion of water at most 10 per cent of the weight of the dicyandiamide or cyanamide and advantageously with the use of a a solid or liquid diluent which acts as a heat buffer.

In the further investigation of this process it has been found that the content of melamine in the reaction product depends in a high degree on the extent to which the reaction vessel is filled by the reacting substance, especially when the operation is conducted in the absence of a solvent. This new effect is particularly evident when the process is conducted with the addition of only a small quantity of ammonia or even without the addition of ammonia. In the latter case the reaction occurs solely in presence of the ammonia produced by side reactions. The considerable influence of the degree of filling of the reaction vessel under the latter conditions is shown particularly clearly in Example 1 hereinafter.

The present invention is based on the foregoing observations and consists in a manufacture of melamine by conducting the reaction of the aforesaid specification in a closed vessel which is filled to a high degree with the reacting substance or substances.

By degree of filling we understand the volume occupied by the starting materials themselves viz. without the included air as expressed in per cent of the total volume content of the reaction vessel. The conception of the degree of filling is sharply to be distinguished from the conception of the bulking volume. This latter is defined as the volume of the starting material in the loose state viz. with the included air. In order to obtain the high degree of filling as disclosed herein, it is usually necessary to compress the material in the course of the filling operation. Another way to obtain this high degree is to fill in the material in the molten state. As a lower limit we consider a filling degree which corresponds to about 30 per cent of air free (for instance molten) material. With a technical dicyandiamide having a bulking volume of 2.5 liters per kilogram a filling degree of about 30 per cent is realized by filling the reaction vessel up to the top. However, for good results a higher filling degree is recommended.

The reaction may be conducted in any kind of vessel suitable for operation under pressure; it is, however, necessary that the ammonia pressure should be maintained during the reaction.

The duration of the reaction varies considerably, depending on the reaction temperature selected. This naturally has the consequence that various mechanical means of carrying out the process come into consideration according to the conditions of the reaction. For example, in the case of a reaction of short duration the reaction vessel, in the interest of a good utilization of the apparatus, may be closed in a manner which will withstand pressure by means of hydraulic pressure instead of by means of screws. The process may also, of course, be conducted in a continuous manner, for example by forcing the reaction mass continuously through a reaction pipe. In the latter case the pressure-tight closure may be provided, for example, by a plug of the material itself which is being fed to the pipe or in the case of a liquid reaction mixture, for example when there is used a solvent or diluent such as an alcohol, liquid ammonia, an amine or a hydrocarbon which is liquid or becomes liquid at the reaction temperature, such as benzine, paraffin oil or anthracene, by means of a valve.

The following examples illustrate the invention, the parts being by weight unless otherwise stated, and parts by weight being related to parts by volume in the same manner as is the kilo to the litre.

Example 1

600 grams of dicyandiamide are packed into a tin vessel having the form of a plate and provided with a cover in such a manner that the vessel is practically completely filled with dicyandiamide. The vessel is then placed in a heated press whose form is suited to that of the vessel. The press is then closed, so that the interior of the vessel is hermetically closed and ammonia formed during the reaction cannot escape. The vessel may, of course, be hermetically closed in various ways; an advantageous way is, for example, by means of a steel packing ring which presses into a packing groove the overlapping and covering edges of the upper and lower part of the vessel. In this manner not only is an advantageous closure obtained but a clean operation in ensured, since in this manner the reaction mass does not come into contact with the press. The pressure which comes into consideration for the reaction is of the order of several hundred atmospheres. When the reaction is ended the press is opened and the vessel containing the cake of the reaction product is removed.

The following are the results obtained in a series of experiments conducted at a temperature of the press of 240° C. and with a reaction duration of half an hour and with different degrees of filling of the reaction vessel:

| No. | Dicyandiamide in grams | Degree of filling | Analysis of the insoluble matter | Reaction mass melamine |
|---|---|---|---|---|
| | | Per cent | Per cent | Per cent |
| 1 | 600 | 100 | 3.0 | 92 |
| 2 | 400 | 67 | 6.5 | 85.5 |
| 3 | 200 | 33 | 15.0 | 77 |
| 4 | 100 | 17 | 42.0 | 52 |
| 5 | 50 | 8 | 46.0 | 44 |

By "insoluble matter" in the above table and in the following examples is meant the residue which remains after dissolving 5 grams of the crude product in 200 cc. of boiling water.

In the above series of experiments the height of the reaction vessel was 25 mms. By conducting the operation in a vessel of smaller height the reaction is completed in a shorter time. Thus, for example, by using a vessel of height 10 mms, which is filled to the extent of 100 per cent, a product containing over 90 per cent of melamine is obtained after only 5 minutes.

Another remarkable result related to the duration of the reaction is that products obtained with a shorter reaction duration contain an appreciably higher proportion of insoluble matter. For example, if in Experiment No. 2 of the above series the treatment in the press lasts only for 15 minutes instead of 30 minutes, the cake of the reaction product will contain 19.5 per cent of insoluble matter and 71.5 per cent of melamine instead of 6.5 per cent of insoluble matter and 85.5 per cent of melamine, notwithstanding that the parent material is completely soluble. Evidently, therefore, there are formed intermediately sparingly soluble products which are transformed into melamine by further reaction.

If instead of dicyandiamide there is used a mixture of equal parts of dicyandiamide and iron powder, similar yields of melamine are obtained already at a lower temperature, for example at 200° C. The effect of the degree of filling of the reaction vessel is similar.

Instead of iron powder there may be used a liquid heat buffer, such as paraffin oil, anthracene oil or the like.

*Example 2*

A closed reaction pipe having a capacity of 10 parts by volume and charged with 13 parts of a mixture consisting of 10.8 parts of dicyandiamide and 2.2 parts by volume of paraffin oil is treated in an oil bath having a temperature of 265° C. for 10 minutes, and then cooled. On opening the pipe ammonia escapes. After the product obtained has been freed from oil by means of petroleum ether it contains 4 per cent of insoluble matter and 90 per cent of melamine.

A larger quantity of oil can be used in order to produce a suspension capable of flowing. Under these conditions it is possible to operate continuously by forcing the suspension through a pipe heated to the reaction temperature and withdrawing the reaction product from the other side of the heating zone by means of a valve.

*Example 3*

7.5 parts of dicyandiamide and 0.7 part of liquid ammonia are treated for 10 minutes at 220° C. in a closed reaction pipe having a capacity of 10 parts by volume. The reaction product is practically free from insoluble matter and contains 96 per cent of melamine.

*Example 4*

A closed reaction pipe is charged with dicyandiamide in quantity amounting to 1.35 parts for each 1 part by volume of its capacity and treated in an oil bath at 350–360° C. for 8 minutes. The reaction product is completely white; it contains 5 per cent of insoluble matter and 88 per cent of melamine.

*Example 5*

A reaction vessel is filled with molten cyanamide, closed and treated in an oil bath at 225° C. for 12 minutes. The product contains 9 per cent of insoluble matter and 74 per cent of melamine.

What we claim is:

1. In the manufacture of 2.4.6-triamino-1.3.5-triazine by heating a cyan derivative of ammonia selected from the group consisting of dicyandiamide and cyanamide in a closed vessel up to temperatures above 100° C. in presence of at most 10 per cent of water based on the weight of the cyan derivative used, the feature of performing the reaction in a closed vessel, the volume of the reacting mass, calculated on an air-free basis being at least 30% of the volume of the vessel.

2. A process according to claim 1, characterized by the fact that the reaction is conducted continuously.

GUSTAVE WIDMER.
WILLI FISCH.
JOSEF JAKL.